United States Patent [19]

Wolfson

[11] 4,150,665
[45] Apr. 24, 1979

[54] HEATER FOR HOT TUBS AND STORAGE TANKS

[76] Inventor: Harris P. Wolfson, 225 San Carlos, Sausalito, Calif. 94965

[21] Appl. No.: 774,270

[22] Filed: Mar. 4, 1977

[51] Int. Cl.² ............................................. F24H 1/28
[52] U.S. Cl. ................................. 126/350 R; 4/179; 126/271; 219/314
[58] Field of Search ................ 68/15, 16; 126/350 R, 126/271; 128/66, 38; 219/314; 4/173 R, 179

[56] References Cited

U.S. PATENT DOCUMENTS

| | | | |
|---|---|---|---|
| 1,105,496 | 7/1914 | Custis | 4/179 |
| 1,128,451 | 2/1915 | Jefferson | 68/15 |
| 1,287,876 | 12/1918 | Carlson | 4/179 |
| 1,288,831 | 12/1918 | Carlson | 4/179 |
| 1,587,717 | 6/1926 | Gardner | 68/15 |
| 3,441,015 | 4/1969 | Oatman et al. | 4/179 |
| 3,797,482 | 3/1974 | Nicollet | 128/66 |

FOREIGN PATENT DOCUMENTS 1481244  4/1967  France .......................... 68/16
2080 of  1853  United Kingdom ............ 4/179

*Primary Examiner*—John J. Camby
*Assistant Examiner*—Larry L. Schwartz
*Attorney, Agent, or Firm*—Fitch, Even, Tabin & Luedeka

[57] ABSTRACT

A heater for use with hot tubs formed from material subject to damage from excessive heat, the heater comprising a heating element arranged within a chamber adjacent a thermally conductive plate with one or more hollow extensions penetrating through a surface portion of the hot tub to permit direct heat transfer between the thermally conductive plate and the hot tub interior. The thermally conductive plate is preferably formed with transparent inserts permitting light from the heating element to enter the hot tub, the heater also preferably including means for communicating additional hot tub accessories with the hot tub interior. The heater may also be employed with other liquid containers, for example, storage tanks which may be alternatively heated by solar energy.

14 Claims, 7 Drawing Figures

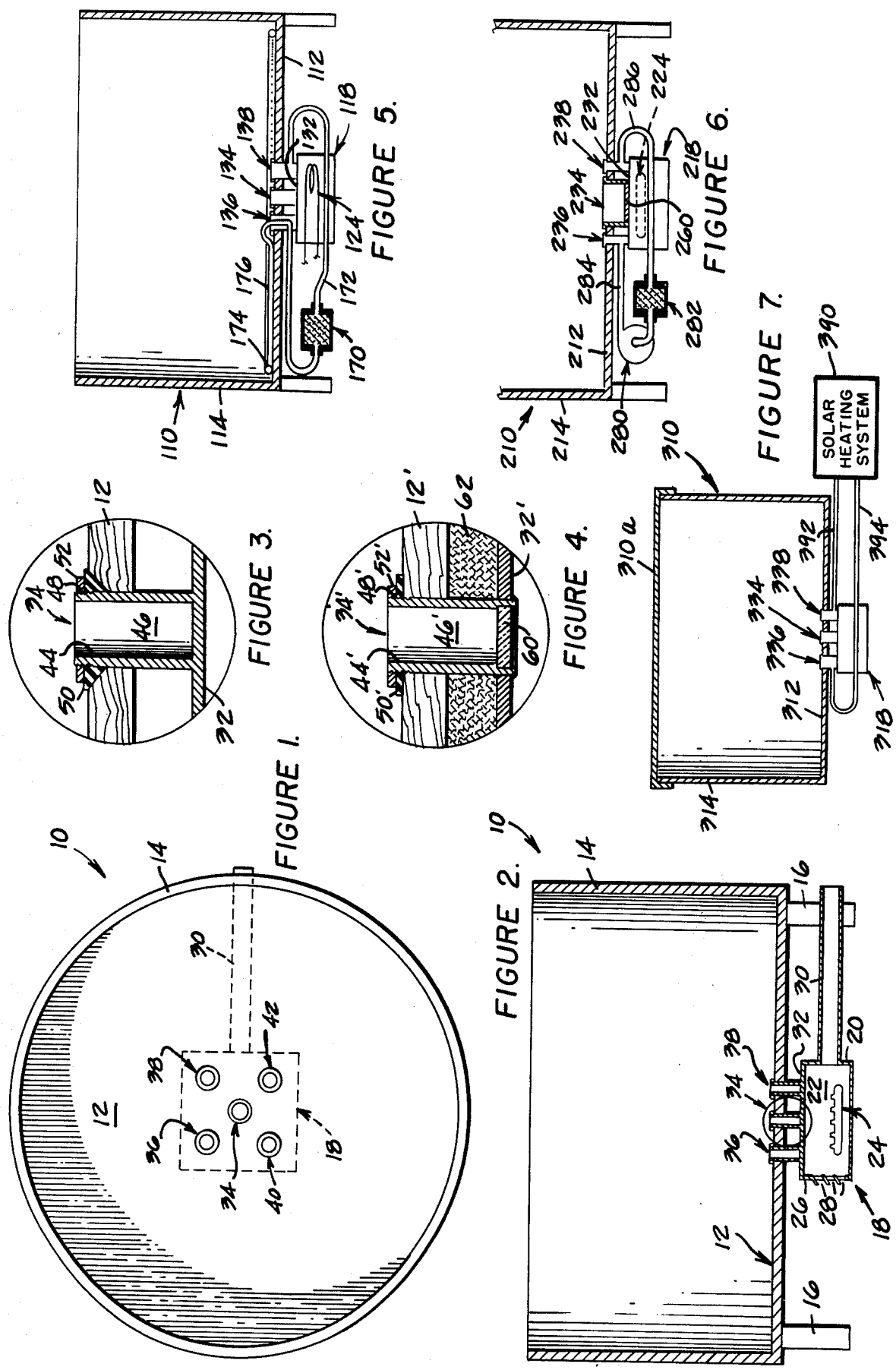

HEATER FOR HOT TUBS AND STORAGE TANKS

BACKGROUND OF THE INVENTION

The present invention relates to a heater for liquid containers such as storage tanks and hot tubs and more particularly to such a heater adapted to permit direct heat exchange between the contained liquid and a thermally conductive plate which is heated by a heating element.

Hot tubs are becoming increasingly popular among people wishing to enjoy either the therapeutic or relaxing effect of hot water soaking. The tubs may be formed in a variety of sizes or shapes and may be used either indoors or outdoors. Most commonly, the tubs are used out-of-doors and are constructed from a suitable wood such as redwood, yellow cedar or teak in order to resist deterioration from the hot water and also from normal weathering. The tubs may also be formed from other materials such as plastic, for example. The tubs may be either rectangular or round. A typical size is four to seven feet in diameter with a depth of from three to four feet. A tub in this size range would have a typical capacity of about 500 to 800 gallons.

In any event, it is desirable to be able to maintain the temperature of the water at an elevated temperature, for example, within the general range of from 100° to 120° F. (approximately 38° to 49° C.).

In order to heat water within hot tubs, it has been common practice to employ an external conduit including a pump and water heater capable of drawing water from the tub, heating the water and returning it to the tub at a rate necessary to mantain a desired temperature within the tub. This method of heating is of course similar to that employed for swimming pools. In fact, heaters and pumps developed for use with large capacity swimming pools have been commonly employed for hot tubs. Since a conventional hot tub may have a capacity of only about five to ten percent that of a swimming pool, it is obvious that such pumps, heaters and other components are of an excessive size and capacity when used with hot tubs.

The cost of accessory items such as heaters, pumps and filters therefore comprises a substantial portion of the cost for installing a hot tub. In addition, such systems tend to be relatively inefficient because of the need to circulate water between the tub and the heater. Even further, the necessary use of a pump for circulating water between the tub and the heater produces substantial undesirable noise.

Accordingly, there has been found to remain a need for a simple, efficient and economical heater for use with hot tubs and other liquid containers or storage tanks, particularly relatively large volume tanks of a type used for example in solar heating systems.

SUMMARY OF THE INVENTION

It is therefore an object of the present invention to provide an efficient and economical heater for liquid containers such as hot tubs and storage tanks.

It is a further object of the invention to provide a heater particularly adapted for use with hot tubs or other containers formed from materials which are subject to damage from excessive heat.

It is yet another object of the invention to provide a heater including a thermally conductive plate which is in direct communication with liquid in the container, heat being applied to the thermally conductive plate by a suitable heating element.

It is an even further object of the invention to provide a heater of the type described immediately above and further including one or more hollow extensions secured to the thermally conductive plate and penetrating openings in a surface portion of the container while also being adapted to receive sealing means for producing a seal between the hollow extensions and the penetrated surface portion.

Yet another object of the invention is to provide a heater for hot tubs and the like wherein portions of the thermally conductive plate are formed from transparent material arranged so that light from the heating element enters the tub interior.

Additional objects and advantages of the invention are made apparent in the following description having reference to the accompanying drawings.

BRIEF DESCRIPTION OF THE DRAWINGS

FIG. 1 is a plan view of a cylindrical hot tub including a heater constructed in accordance with the present invention.

FIG. 2 is a centrally sectioned side view of the hot tub and associated heater of FIG. 1.

FIG. 3 is an enlarged fragmentary view of a hollow insert extending from the heater through an opening in a surface portion of the tub.

FIG. 4 is a view similar to FIG. 3 while illustrating another embodiment of the invention.

FIG. 5 is a centrally sectioned side view of a cylindrical hot tub and yet another embodiment of a heater adapted to provide communication for other accessory components with the hot tub.

FIG. 6 is a view generally similar to FIG. 5 while illustrating an even further embodiment of the invention.

FIG. 7 is a side view in elevation of still another embodiment of the invention.

DESCRIPTION OF THE PREFERRED EMBODIMENTS

Each of the embodiments illustrated in FIGS. 1-7 illustrates a liquid container such as a hot tub or storage tank wherein heat from a suitable heating element is applied to a thermally conductive plate. The thermally conductive plate is in direct communication with the liquid through one or more hollow extensions penetrating a surface portion of the container with means forming a seal between the extension and the penetrated surface portion. The heater may of course be in communication with the container interior through either a floor portion or sidewall portion. However, for most efficient heating, the hollow extensions preferably are arranged within the container floor.

It will also be obvious from this brief summary of the invention that a heater constructed in accordance with the present invention could also be employed for use with any hot tub or pool structure for example where it is desirable to elevate the temperature of the water. For example, the heater could be used in conjunction with a hot tub forming a high temperature extension of a pool. The heater could even be connected to an integral surface portion of a swimming pool itself to provide heating. The storage tank of FIG. 7 illustrates yet another application for the heater.

A heater constructed in accordance with the present invention provides a number of advantages which are summarized immediately below, before proceeding with a detailed description of the heater with reference to the drawing. Initially, the heater is particularly efficient since it does not require a pump for circulating water between the hot tub interior and the heater. Previous systems, particularly those employed in conjunction with such hot tubs formed from material subject to damage from excessive heating, employ circulating pumps with the heater being arranged in a remote location relative to the tub. This necessarily results in inefficient operation, inefficient heating and excessive noise due to continued or intermittent operation of the pump.

The present heater also adapts itself for compact arrangement within a minimum space directly adjacent the tub. Preferably, the tub may be supported upon a suitable structure with the heater being arranged in a very limited space beneath the hot tub floor.

The use of hollow extensions for communicating a thermally conductive plate of the heater with the hot tub interior particularly facilitates installation of the heater without weakening that portion of the tub surface or floor through which the extension penetrates. In addition, with the extensions penetrating a floor portion of the hot tub, they will contain water in direct contact with the thermally conductive plate even when the tub is nearly empty. It would of course be undesirable to operate the heater with an empty tub since heat from the plate would then tend to be transferred to adjacent surface portions of the tub.

The efficiency of the present heater is particularly apparent if a gas burner is considered as the heating element. Normally, the use of a pilot light in conjunction with a gas heater makes up approximately forty percent of its gas consumption. With the present hot tub heater being adapted for use with a gas burner as its heating element, the pilot light may be employed to maintain a minimum temperature within the tub. For example, with an average outside temperature of approximately 50° F., the pilot light for a gas burner employed within the present heater will maintain the water in a 1,000 gallon capacity tub at a temperature of approximately 85° F. This assumes that the tub is covered. Thus, only a short heating time is necessary to bring the temperature of the hot tub water up to the desired range of 110°–120° F., for example.

It is of course obvious that other heating elements such as electrical heaters may also be employed within the hot tub heater.

The direct communication between a thermally conductive plate of the heater and the hot tub interior also permits the use of a transparent insert within the thermally conductive plate to allow light from the heating element to pass directly into the hot tub interior. The transparent insert may either be thermally conductive itself or heat may be transferred by the surrounding thermally conductive plate and the hollow extension. In any event, such an arrangement is aesthetically desirable because of the effect of the light from the heating element within the tub.

Finally, because of the efficient operation of the present heater, it is possible to maintain the temperature of water in the hot tub within or close to the desired temperature range described above. Accordingly, the tub may be ready for use generally at any time or else only a very short time is required to raise the water temperature in the tub to a desired soaking temperature.

Referring now to the drawing and particularly to FIGS. 1 and 2, a hot tub of the type contemplated by the present invention is generally indicated at 10. The tub includes a floor 12 and side walls 14 preferably having a cylindrical configuration.

The hot tub 10 is supported above the ground level by a support structure 16 so that minimum space of for example ten inches, is available beneath the hot tub floor.

A heater constructed according to the present invention is illustrated at 18 and includes fabricated walls 20 forming a heating chamber 22 within which a suitable heating element 24 is arranged. The heating element 24, is illustrated in FIG. 2, is preferably a gas burner. Accordingly, one side wall 26 of the structure 20 is formed with inlet vents 28 for admitting air into the chamber 22 for supporting operation of the gas burner 24. An outlet vent 30 communicates hot air and exhaust gas from the chamber 22 outwardly of the tub 10 so that it is not directed against the relatively heat sensitive material of the tub.

A most important feature of the burner 18 is a thermally conductive plate 32 arranged adjacent and preferably above the heating element 24 for most efficient operation. The thermally conductive plate 32 is in direct communication with the interior of the hot tub 10 by means of one or more hollow extensions such as those indicated at 34, 36, 38, 40 and 42 in FIGS. 1 and 2. The construction of each of these extensions is generally similar with the construction of the centrally arranged extension 34 being illustrated in detail in FIG. 3.

Referring to FIG. 3 as well as FIGS. 1 and 2, the extension 34 includes a hollow cylindrical element 44 which is secured directly to the thermally conductive plate 32 in order to form a cell or chamber 46 which provides direct communication between the thermally conductive plate 32 and the interior of the hot plate. Heat from the heating element 24 is applied to the thermally conductive plate 32 and transferred directly into the hot tub interior by convention circulation of water from the tub within the cell 46. Thus, the present heater also provides for natural circulation of heated water within the tub.

The cylindrical element 44 preferably extends upwardly above the hot tub floor 12 while being threaded as indicated at 48. A sealing element or washer 50 may be arranged about the upwardly extending portion of the element 44 with a washer or threaded element 52 being engaged with the threaded end 48 of the element 44 to urge the seal 50 into sealing engagement with both the cylindrical element 44 and the hot tub floor 12. It may be seen that the size of the opening formed within the floor 12 to receive the hollow extension 44 need not be accurately sized but may have a generally loose tolerance.

Accordingly, installation of the heater within any hot tub is particularly simple. An opening generally sized to receive each hollow extension such as those indicated at 34–42, may be formed in a surface portion of the hot tub, preferably its floor 12. These openings may of course be located upon the floor 12 by use of a suitable template. With the openings being cut in the floor, the hollow extensions for the heater may be placed therein and sealed in the manner described above with reference to FIG. 3.

Another embodiment of the heater is illustrated by FIG. 4 which is a fragmentary view generally similar to FIG. 3. The embodiment of FIG. 4 includes generally similar components as those described above in connection with FIGS. 1–3. Accordingly, similar components in FIG. 4 are illustrated by primed numerals. The embodiment of FIG. 4 differs primarily in the use of a transparent insert 60 which permits light from a heating element such as that indicated at 24 in FIG. 2 to pass directly into the hot tub interior. Preferably, the cylindrical extension element 44' extends through the thermally conductive plate 32' and is secured thereto, for example by welding. The transparent insert 60 is then secured in sealed relation within the lower end of the hollow extension 44.

The transparent insert 60 may be a thermally conductive material such as tempered, high silica glass. Such a material is available for example from Pittsburgh Plate Glass Industries under the trademark HERCUVIT or from Corning Glass Works under the trademark PYROCERAM. Such thermally conductive materials are available in either translucent or relatively transparent form.

Preferably, the fabricated walls 20 for the heater of FIG. 2, are insulated to prevent loss of heat from the chamber 22. For example, the walls 20 may be formed from spaced apart sheets of a suitable material such as aluminum with insulating material such as asbestos being arranged between the walls. Similarly, insulating material is also preferably arranged about the hollow extensions 34-42 to prevent heat from the thermally conductive plates from drying out or otherwise damaging the hot tub floor 12. Such insulating material, preferably in the form of asbestos installation is illustrated at 62 in FIG. 4.

The embodiments of FIGS. 5 and 6 illustrate use of a similar heater which is further adapted for providing an interconnection between the hot tub interior and other accessory items such as pulsating pumps and filters for example.

Referring initially to FIG. 5, a hot tub 110 similar to that illustrated at 10 in FIGS. 1-3, is equipped with a heater 118 having a heating element 124 which is preferably an electrical element. The heater 118 has a thermally conductive plate 132 arranged above the heating element 124 with similar hollow extensions, three of which are indicated at 134, 136 and 138, projecting upwardly through the tub floor 112 into its interior. The hollow inserts 134-138 are generally similar in construction to that described above in connection with FIGS. 1 and 2 and particularly FIG. 3.

Accordingly, the heater 118 of FIG. 5 functions in essentially the same manner as the heater 18 of FIGS. 1-3. In addition, however, certain of the hollow inserts 134-138 are employed to circulate water between the hot tub interior and a filter element generally indicated at 170. In order to achieve natural circulation through the filter element 170 and avoid the use of a relatively noisy and expensive pump, a supply line 172 from the filter element 170 is in communication with the hollow interior of the central extension 134 which is arranged directly above the heating element 124. A return line for the filter element includes a conduit 174 arranged about the periphery of the hot tub which is assumed to be relatively cool. The conduit 174 is perforated to permit water from the hot tub interior to enter the conduit. A return conduit 176 extends between the peripheral conduit 174 and the filter element 170 and passes through one of the outer hollow extensions, for example that indicated at 136. In this manner, filtered water in the supply line 172 flows upwardly into the hot tub interior because of the relatively high temperature achieved directly above the heating element 124. Relatively cool water from the peripheral conduit 174 tends to be drawn through the filter element 170. The filter element 170 may be equipped, for example with a filter mesh having relatively low flow resistance.

The embodiment of FIG. 6 also includes a generally similar hot tub indicated at 210. A heater 218 includes a heating element 224 arranged beneath a thermally conductive plate 232. Heating of the water within the tub 210 is accomplished primarily through a large hollow extension 234 which is generally similar to those described above except that it is considerably larger in order to permit the same amount of circulation of heated water.

Additional hollow extensions 236 and 238 are employed primarily for communicating the hot tub with additional accessory items including a pulsating pump 280 and a filter box 282. A supply line 284 is connected with the pump 280 and with the hot tub interior through the hollow extension 236 for introducing pulsating flow into the tub. A return line 286 is connected with the other hollow extension 238 and is in communication with the pump 280 through the filter 282. Thus, if a pulsating pump is desired in conjunction with the hot tub, its pumping effect may be employed to achieve an increased rate of filtering.

The embodiment of FIG. 6 is particularly adapted for the use of a transparent insert as generally indicated at 260 since the relatively large size of the single hollow extension 234 readily permits light from the heating element 224 to pass into the tub interior.

The embodiment of FIG. 7 illustrates a heater 318 employed for heating liquid in a container, preferably water in a storage tank 310 also equipped with solar heating means schematically represented at 390 and having inlet and outlet lines 392 and 394 connected with the tank 310.

Preferably, the lines 392 and 394 are connected with the tank through the heater in the same manner described above with reference to FIGS. 5 and 6. The inlet and/or outlet lines may extend into the tank interior for efficient heating of water in the tank.

Conduit means (not shown) for drawing heated water from the tank and for supplying fresh water to the tank may also be connected with the tank through the heater 318.

Within such an arrangement, the heater 318 is particularly effective as a backup heater permitting a solar heating system to be used twelve months of the year.

Solar heating systems normally require relatively large storage tanks of as much as 1,000 gallons or more. Conventional heaters such as home water heaters are generally not suitable for heating such large volume tanks. In the past, solar heating systems have normally required relatively complete, self-contained back-up heating systems using gas or electricity, for example, to assure adequate heating during winter months.

On the other hand, the heater of the present invention may readily be used for efficient direct heating of the same storage tank used in a solar heating system with little or no duplication of circulation or storage components. The tank 310 is provided with a cover 310a and may of course be insulated to even further improve efficiency of the solar heating/direct transfer heating system illustrated in FIG. 7.

Additional modifications and variations of the above described embodiments are believed to be clearly apparent. Accordingly, the scope of the present invention is defined only by the following appended claims.

What is claimed is:

1. In combination with a hot tub useful for bathing and having an unheated floor formed from material subject to damage from excessive heat, a heater comprising means forming a chamber arranged beneath said floor of the tub with a heating element disposed therein, said heater being adapted to provide heat output in a predetermined range, a thermally conductive plate arranged below the level of said floor adjacent the heating element, at least one hollow extension secured to said thermally conductive plate and extending upwardly through an opening in said floor, said hollow extension having a cross-sectional size sufficient to prevent a users contact with said thermally conductive plate and to provide substantial convection circulation of water from the thermally conductive plate throughout the interior of the hot tub in said predetermined range of heat output for uniformly heating water throughout the hot tub interior, said hollow extension serving to insulate the thermally conductive plate of the heating element chamber from said hot tub floor which is subject to damage from excessive heat, and seal means arranged about said extension in sealing engagement with said hollow extension and hot tub floor.

2. The combination of claim 1 further comprising a plurality of said hollow extensions similarly extending upwardly from said thermally conductive plate through a plurality of openings in the hot tub with similar seal means providing a seal between the respective hollow extensions and the hot tub.

3. The combination of claim 1 wherein the heating element is a gas burner, the chamber means further comprising intake means for supplying air to the burner and vent means for venting hot gases from the gas burner.

4. The combination of claim 1 wherein the heating element is an electrical resistance heater.

5. The combination of claim 1 wherein the thermally conductive plate comprises a substantially transparent plate means in communication with the hollow interior of the insert.

6. The combination of claim 1 wherein the hollow extension is formed as a cylinder, the upper end of the hollow cylindrical extension being threaded and further comprising threaded washer means engaged with the threaded extension to maintain the seal means in place and to secure the heater to the hot tub.

7. The combination of claim 1 wherein the heater comprises means for communicating additional accessories with the interior of the hot tub.

8. The combination of claim 7 further comprising filtration means associated with the heater, the filtration means including supply means for delivering filtered water to a relatively hot portion of the hot tub interior and withdrawal means for receiving liquid to be filtered from a relatively cool portion of the hot tub interior.

9. The combination of claim 7 wherein said accessories comprise a pulsating pump including supply means for introducing a pulsating flow of water into the hot tub interior and withdrawal means for receiving water from the hot tub interior.

10. The combination of claim 9 further comprising filtration means arranged in series with said pulsating pump.

11. The hot tub of claim 1 further comprising insulation arranged about said hollow extensions between said thermally conductive plate and the hot tub floor.

12. The combination of claim 1 wherein a portion of the thermally conductive plate which is in direct communication with the hot tub interior through the hollow extension is transparent so that light produced by the heating element passes into the hot tub interior.

13. The combination of claim 12 wherein the transparent plate is a tempered glass which is thermally conductive.

14. In a method for applying heat to water within a hot tub, the steps comprising forming a heater to include a heating element adjacent a thermally conductive plate with a hollow extension being secured to the thermally conductive plate opposite the heating element, the hollow extension having a cross-sectional size sufficient to prevent a users contact with said thermally conductive plate forming an opening in a surface portion of the hot tub to receive the hollow extension from outside the hot tub, forming a seal between the hollow extension and the surface portion of the tub and thereafter operating the heating element for applying heat to the thermally conductive plate in order to transfer heat from the thermally conductive plate directly to the hot tub interior through the hollow extension and controlling the heat output of said thermally conductive plate to provide convection circulation of the water throughout the hot tub for uniformly heating the water therein.

* * * * *